(12) United States Patent
Cheng

(10) Patent No.: US 9,387,817 B2
(45) Date of Patent: Jul. 12, 2016

(54) MOTOR VEHICLE USED SEALED TRANSMISSION CABLE

(71) Applicant: Hsu-Cheng Cheng, New Taipei (TW)

(72) Inventor: Hsu-Cheng Cheng, New Taipei (TW)

( * ) Notice: Subject to any disclaimer, the term of this patent is extended or adjusted under 35 U.S.C. 154(b) by 40 days.

(21) Appl. No.: 14/313,002

(22) Filed: Jun. 24, 2014

(65) Prior Publication Data

US 2015/0367790 A1  Dec. 24, 2015

(51) Int. Cl.
| | |
|---|---|
| *H01R 13/52* | (2006.01) |
| *B60R 16/02* | (2006.01) |
| *H01R 27/02* | (2006.01) |
| *H01R 13/502* | (2006.01) |
| *H01R 25/00* | (2006.01) |

(52) U.S. Cl.
CPC ........ *B60R 16/0215* (2013.01); *H01R 13/5202* (2013.01); *H01R 13/502* (2013.01); *H01R 25/003* (2013.01); *H01R 27/02* (2013.01)

(58) Field of Classification Search
CPC .......................... H01R 13/502; H01R 13/5202
USPC .................. 439/277, 278, 281, 282, 587, 606
See application file for complete search history.

(56) References Cited

U.S. PATENT DOCUMENTS

| 4,556,271 | A | * | 12/1985 | Hubbard | ................ | H01R 24/40 439/271 |
| 5,980,317 | A | * | 11/1999 | McNeel | ............... | H01R 13/502 439/281 |
| 5,984,724 | A | * | 11/1999 | McNeel | ............... | H01R 13/405 439/281 |
| 7,641,494 | B2 | * | 1/2010 | Chen | .................. | H01R 13/5845 29/858 |
| 7,803,005 | B1 | * | 9/2010 | Speaker, IV | ....... | H01R 13/5221 439/278 |
| 2011/0130035 | A1 | * | 6/2011 | Ebihara | .............. | H01R 13/5205 439/587 |

* cited by examiner

*Primary Examiner* — Tho D Ta
(74) *Attorney, Agent, or Firm* — The Weintraub Group, P.L.C.

(57) ABSTRACT

A motor vehicle used sealed transmission cable, including at least one or more transmission cables, and a sealing component. The cable has a first connector and a second connector set at two ends of a transmission line. The sealing component has a first sealing component. The central axis of the first sealing component is set with a lashing eye for the setting and positioning of the first connector, and is extended to a first skirt section in an axial direction at the outer circumferential surface, which forms the interior of the first socket mouth. The first buckling part is set at the inner peripheral surface of the first socket mouth in a radial direction. Additionally, inside the first skirt section, a projection part is connected in an axial direction for passing through of all transmission lines. Inside of the projection section, cladding pipe is set for piercing and cladding of all transmission lines.

9 Claims, 6 Drawing Sheets

MOTOR VEHICLE USED SEALED TRANSMISSION CABLE

BACKGROUND OF THE INVENTION

1. Technical Field

The present application concerns a transmission cable, especially a motor vehicle sealed transmission cable.

2. Description of the Prior Art

The convenience of 3C products, such as a smart phone, GPS or driving recorder, charging, navigation system or video recording power demands must be met while driving motor vehicles, such as motorcycles, electric motor cars or electric bikes. Therefore, a power taking device can be equipped on the motor vehicles only if the waterproof and dustproof difficulties of the power taking device can be solved. Furthermore, such a device must be convenient for the drivers of the motor vehicles, who can take power via the power taking device.

Based on above stated requirements, there is a "Power Taking Socket" disclosed in No. M425800 Taiwan Patent Gazette where the power taking socket is set in a circuit board in the shell. The circuit board has a power conversion circuit. Furthermore, at least 1 USB socket is connected forward and backward, and two electric wires are passed through from the back end of the shell.

The outer surface of the shell is set on a flange and an outer thread section respectively on radial direction. Furthermore, the outer thread section is screwed with a knob which has internal thread section. Additionally, an end cap is cup jointed in front of the USB socket. The end cap is fixed in the nozzle which is in front end of the shell. When the device is used, by plugging into the USB plug of an electronic product, such as the transmission lines of a smart phone, in the USB socket, can power the smart phone.

According to the prior art, the electronic product can only be supplied power when the USB plug of transmission lines is plugged in the USB socket for the power taking socket. Although the power taking socket has waterproof and dustproof properties, rain water may flow in the USB socket along the USB plug on a rainy day, potentially causing a short circuit, and even to cause damage of electronic product.

Therefore, for such a transmission cable, if a sealing component is not added, electrical connection still cannot be taken for the power taking socket and electronic products on a rainy day.

Accordingly, the main purpose of the present invention is to provide a sealed power transmission cable for a motor vehicle, including at least one or more transmission cables. The device has a first connector at one end of all transmission lines is integrated in the sealing component.

When the sealing component is cup jointed with the motor vehicle used power taking device, in addition to connecting the first connector with the motor vehicle used power taking socket to form electrical connection, waterproof, dustproof and shockproof effects are provided between all transmission lines and the motor vehicle used power taking device all relying on the sealing component.

To achieve the foregoing object, the technical means adopted by the present case is to provide a kind of motor vehicle used sealed transmission cable, including at least one or more transmission cables, and a sealing component. The cable has a first connector and a second connector set at two ends of a transmission line. The sealing component has a first sealing component. The central axis of the first sealing component is set with a lashing eye for the setting and positioning of the first connector, and is extended to a first skirt section in an axial direction at the outer circumferential surface, which forms the interior of the first socket mouth. The first buckling part is set at the inner peripheral surface of the first socket mouth in a radial direction. Additionally, inside the first skirt section, a projection part is connected in an axial direction for passing through of all transmission lines. Inside of the projection section, cladding pipe is set for piercing and cladding of all transmission lines.

DESCRIPTION OF THE INVENTION

Figure 1:
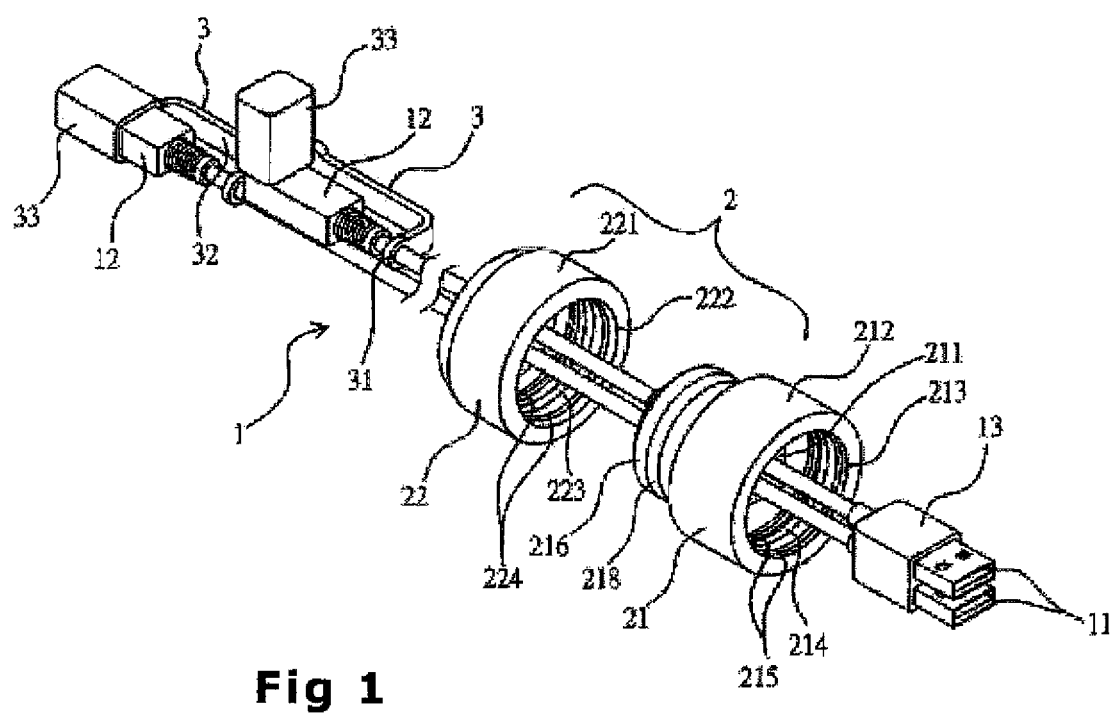
FIGS. 1 and 2 depict two partial graphic models of the case motor vehicle used sealed transmission cable hereof from different perspectives.
Figure 4:
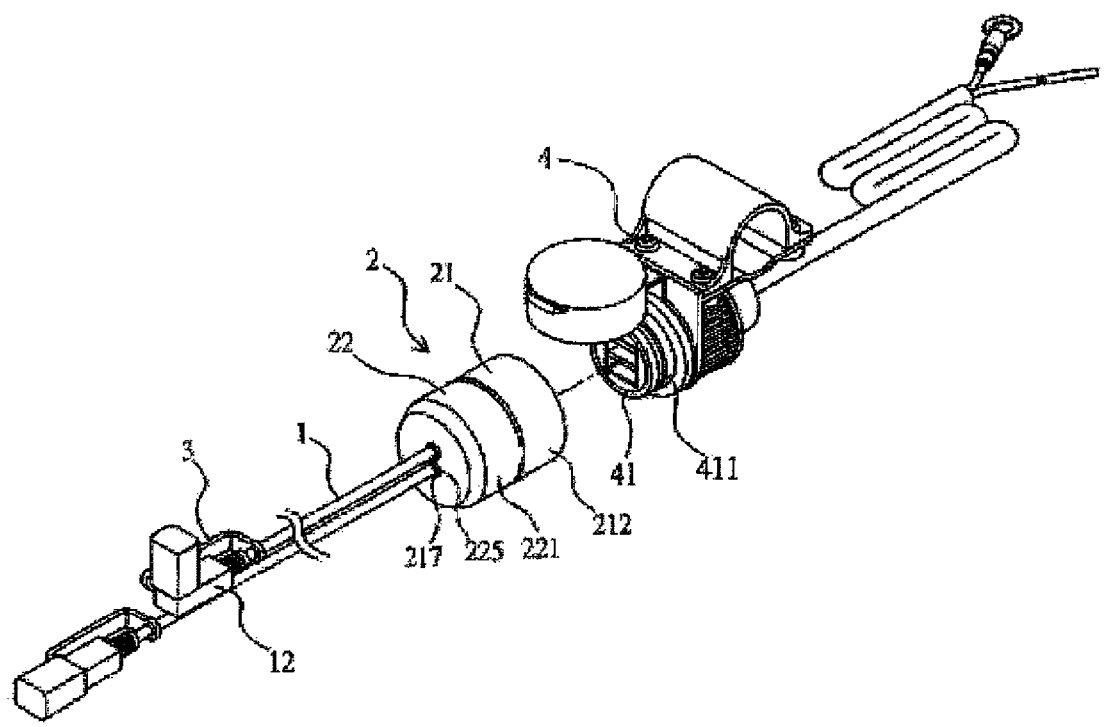
FIG. 4 is a graphic model before assembly of the case motor vehicle used sealed transmission cable and motor vehicle used power taking socket.

Referring to FIGS. 1 and 4, as shown, the motor vehicle used sealed transmission cable comprises one or more transmission cables or transmission lines 1 and a sealing component 2.

There is at least one transmission line 1. Furthermore, a first connector and the second connector 11, 12 are set at two ends of all transmission lines 1 respectively. The first connector 11 is a standard USB connector. The second connector 12 is a corresponding electronic device, such as smart phone, GPS or mini USB, micro USB connector of a driving recorder having preset connection port or connection with 30 or 8 pins. Since such are well known to a skilled artisan the information is known skill, no further detail is given here.

Figure 2:
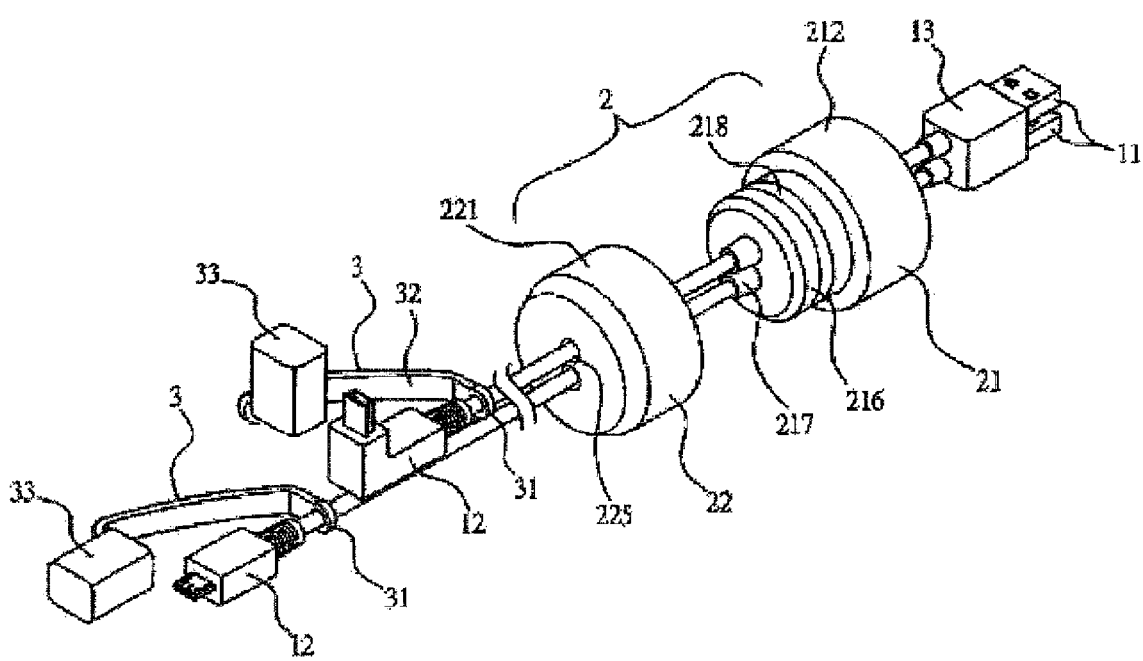

Referring to FIGS. 1 and 2 the motor vehicle used sealed transmission line includes at least two transmission lines 1, two first connectors 11 at one end of the transmission lines 1 are coated with an integrated cladding body 13.

Figure 3:
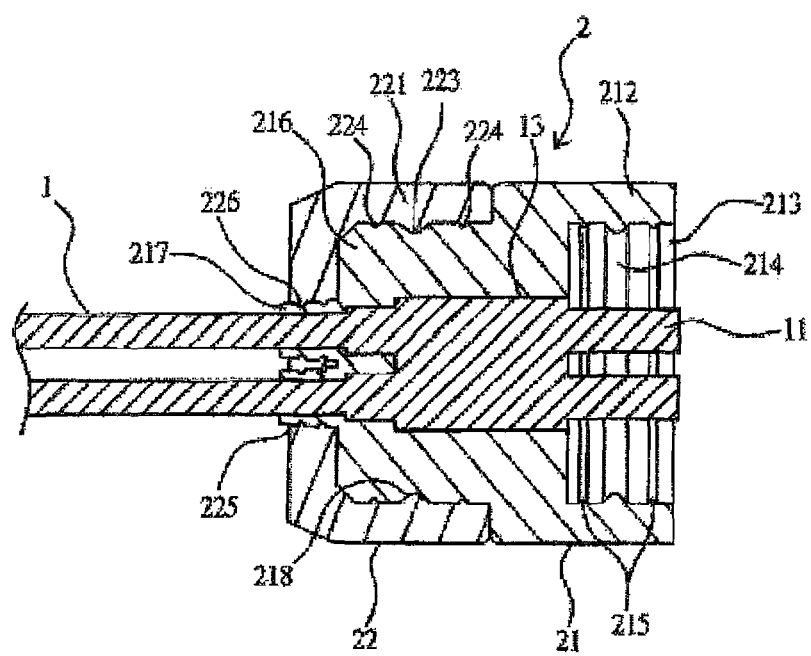
FIG. 3 is the partial, enlarged sectional view of the motor vehicle used sealed transmission cable.

The sealing component 2 has a first sealing component 21. The first sealing component 21 is polymeric elastomer, preferably rubber or silicon. The center is set with an opening or lashing eye 211, for setting and positioning of the first connector 11 and cladding body 13, in an axial direction (as in FIG. 3).

The outer circumferential surface is extended to the first skirt section 212, which has a first socket mouth 213, disposed in an axial direction.

The first skirt section 212 and the first socket mouth 213 correspond to the motor vehicle used power taking socket 4 (as in FIG. 4), similar to the nozzle part 41 of "Power Taking Socket" in No. M425800 Taiwan Patent Gazette, which is hereby incorporated by reference, and has a round shape. It is to be understood that the present invention is not limited to the round shape.

Furthermore, first skirt section 212 is connected to the nozzle part 41. Therefore, the inner peripheral surface of the first socket mouth 213 is set or fixed to a first buckling part 214 in a radial direction, such as with a snapping ring or catching groove, so that it is buckled with the nozzle part 41 corresponding to the recessed catching groove or snapping ring 411.

When the first buckling part 214 is buckled with the nozzle part 41, the first skirt section 212 is coated with connected by the outer circumferential surface of the nozzle part 41 tightly and has waterproof, dustproof and shockproof effect.

Furthermore, to provide waterproof and dustproof effect further, the inner peripheral surface of the first socket mouth 213 is set with at least one first sealing ring 215 at the outside and/or inside of the first buckling part 214, so that multiple waterproof and dustproof effects are formed at the outer circumferential surface of the nozzle part 41.

The inside of the first skirt section 212 is connected with a solid projection part 216 having a smaller size for passing through all transmission lines 1. The inside of the solid projection part 216 has a taper shaped cladding pipe 217 for passing through and cladding all transmission lines 1, so as to prolong the waterproof and dustproof effect of all transmission lines 1.

Furthermore, the sealing component 2 includes a set of the second sealing components 22, which are connected with the projection part 216, inside of the first sealing component 21.

The second sealing component is plastic or elastomeric polymer, preferably rubber or silicone gel product.

The outer circumferential surface extends to a set of second skirt sections 221, which are connected with the projection part 216, in an axial direction, so that a cladding is formed to the projection part 216.

The jointing surface of the second socket mouth 222 in the second skirt section 221 and the projection part 216 is attached to a second buckling part 223, which are buckled mutually, through a snap ring or catching groove or the like, and a third first buckling part 218, such as a catching groove snapping ring or the like. Furthermore, the inner peripheral surface of the second socket mouth 222 is attached at least to the second sealing ring 224 on the outside and/or inside of the second buckling part 223, so that waterproof and dustproof effects are formed with the projection part 216.

Inside of the second sealing component, 1 or more piercing holes 225 are provided for piercing of the cladding pipe 217. At least one third sealing ring 226 is provided at the inner peripheral surface of all piercing holes 225 in a radial direction, so that all piercing holes 225 are formed with waterproof and dustproof effects with the cladding pipe 217.

Furthermore, each of the second connectors 12 include a capping component 3 comprising a cover cap 33 and a neck strap 32 interconnecting the cover cap 33 to a respective transmission line 1 at opposing ends. Each cover cap 33 is also made of polymeric elastomer. A cover ring 31 is disposed on one end of the neck strap 32 opposite the cover cap 33 and is connected to a respective transmission line 1. The internal diameter of the cover cap 33 is equal to the external diameter of the second connector 12, so that each of the second connectors 12 will be closed or opened and liquid or dust cannot enter into the second connector 12. Thus, both a waterproof and a dustproof effect is provided.

Figure 5:
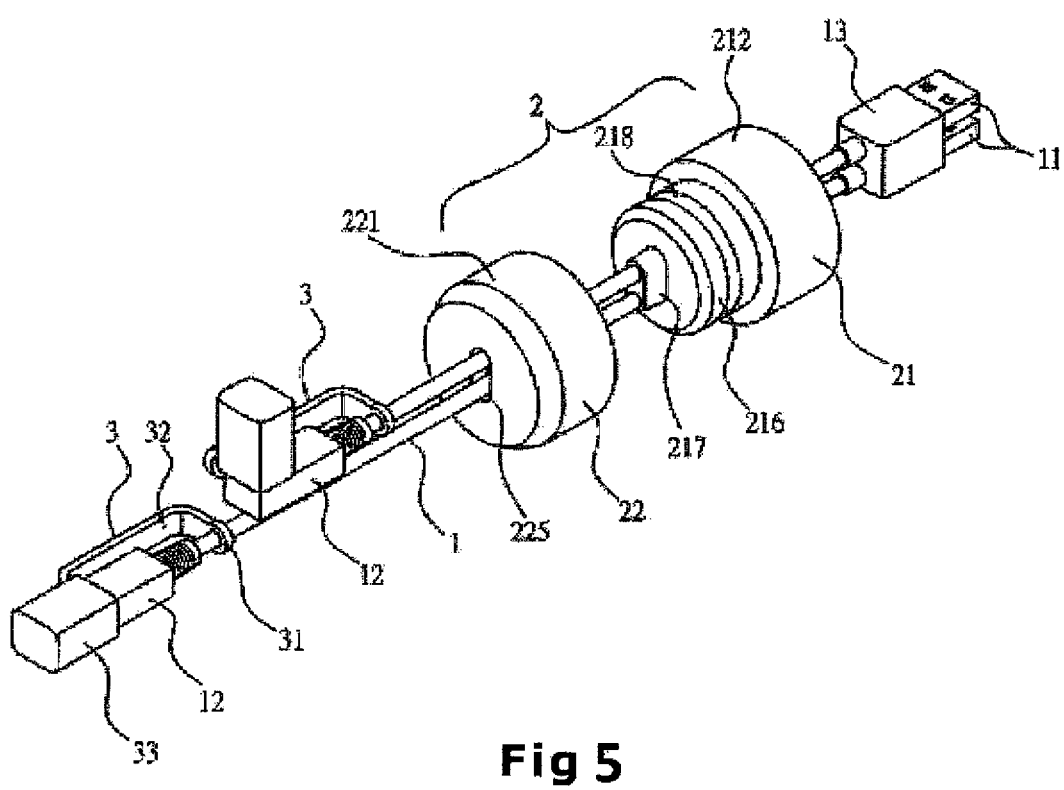
FIG. 5 is a graphic model of a second embodiment of the motor vehicle used sealed transmission cable hereof.
Figure 6:
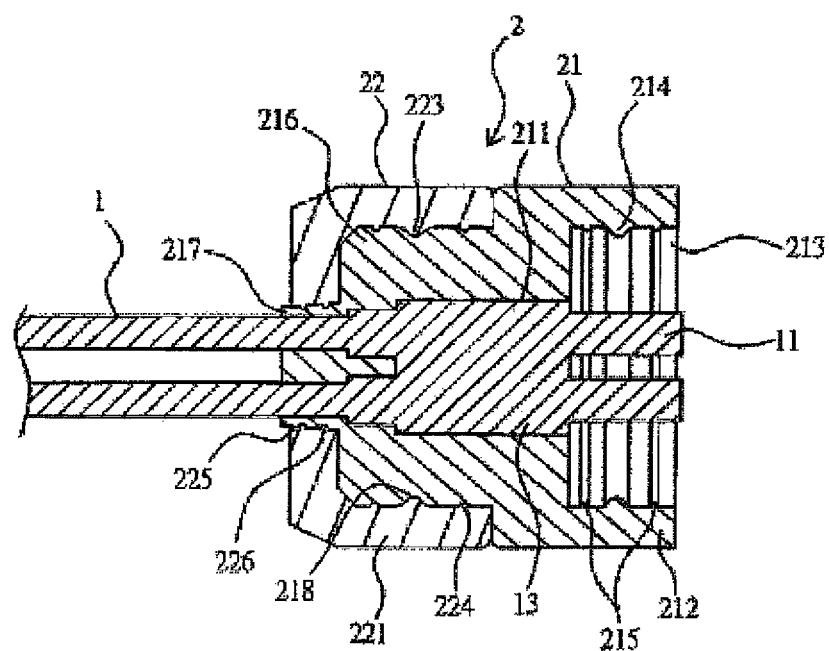
FIG. 6 is the partial enlarged sectional view of the second embodiment hereof.

Referring to FIG. 5 and FIG. 6. there is shown a second schematic diagram of a second embodiment of the motor vehicle used sealed transmission line. The differences between this embodiment and the first embodiment is that the cladding pipe 217 is long conical shape for passing through of one or more transmission line 1, and piercing the hole 225 inside surface of projection part 216 which is a long round shape for piercing the cladding pipe 217. Furthermore, the inner peripheral surface of the piercing hole 225 is set with at least one third sealing ring 226.

Therefore, with the implementation of the present invention, the combination of one end of the transmission line and the sealing component makes the first connector fixed on the $1^{st}$ skirt section of the first sealing component. Additionally, relying on the first buckling part being set in the inner peripheral surface of the first socket mouth and at least one first sealing ring, after the sealing components are combined with the known motor vehicle used power taking socket, it does not only form an electrical connection, but has the further advantage of being waterproof, dustproof and shockproof.

Furthermore, the first sealing component can be cup jointed with the second sealing component, so that all transmission lines have waterproof and dustproof advantages.

The invention claimed is:

1. A motor vehicle used sealed transmission cable, including:
    (a) at least one transmission line, at least one first connector and at least one second connector interconnected to each other by the at least one transmission line at opposing ends, respectively;
    (b) an integrally formed first sealing component comprising a cylindrical and hollow first skirt section and a cylindrical projection part, the first skirt section and projection part extending axially in opposite directions from a center of the first sealing component, the center of the first sealing component being set at a lashing eye in an axial direction for coating and positioning the at least one first connector;
    (c) the first skirt section having a first socket mouth, the first skirt section extends in an axial direction toward the at least one first connector and terminates at the first socket mouth, the first skirt section includes an interior circumferential surface, a first buckling part is disposed on the interior circumferential surface of the first skirt section;
    (d) the projection part, extending in an axial direction towards the at least one second connector, includes an outer circumferential surface, a cladding pipe integrally formed with the projection part extends in an axial direction from the projection part towards the second connector for cladding the at least one transmission line extending therethrough; and
    wherein the first sealing component is slidably positionable along the length of the at least one transmission line as the at least one transmission line extends entirely through the cladding pipe, projection part, lashing eye, and first skirt section of the first sealing component.

2. The motor vehicle used sealed transmission cable of claim 1 wherein the at least one first connector is a standard USB connector and the at least one second connector is selected from the group consisting of a mini USB micro USB and connector with 30 or 8 pins.

3. The motor vehicle used sealed transmission cable of claim 1 wherein the first sealing component is made of polymeric elastomer, the first buckling part is a snap ring or catching groove, and a first sealing ring is disposed on the interior circumferential surface of the first skirt section proximate the first socket mouth.

4. The motor vehicle used sealed transmission cable of claim 1 further including:
    (a) a second sealing component comprising a cylindrical and hollow second skirt section, the second skirt section having a second socket mouth, the second skirt section extending laterally from a center of the second sealing component towards the first sealing component and terminates at the second socket mouth, at least one piercing hole having an interior surface disposed at the center of the second sealing component wherein the second sealing component is positionably mounted on the at least one transmission line as the at least one transmission line extends through the at least one piercing hole and second skirt section of the second sealing component, the second skirt section includes an interior circumferential surface, a second buckling part is disposed on the interior circumferential surface of the second skirt section,
(b) a third sealing component disposed on the outer circumferential surface of the projection part;
wherein the second buckling part of the second sealing component mates with the third buckling part of the first sealing component such that the cladding pipe passes through the piercing holes.

5. The motor vehicle used sealed transmission cable of claim 4 wherein the second sealing component is made of plastic or elastomeric polymer, the second buckling part is a snap ring or catching groove, and the third buckling part is a catching groove or snap ring corresponding to that of the second buckling part.

6. The motor vehicle used sealed transmission cable of claim 4 wherein a second sealing ring is disposed on the inner circumferential surface of the second skirt section proximate the second socket mouth.

7. The motor vehicle used sealed transmission cable of claim 4 wherein the cladding pipe is tapered and a third sealing ring is disposed on the interior surface of the at least one piercing hole in a radial direction.

8. The motor vehicle used sealed transmission cable of claim 1 wherein each of the at least one second connectors includes a capping component, the capping component comprising:
(a) a neck strap having a first end and a second end;
(b) a cover cap disposed on the first end of the neck strap, and
(c) a cover ring disposed on the second end of the neck strap mounting the neck strap onto the at least one transmission line.

9. The motor vehicle used sealed transmission cable of claim 1 comprises two transmission lines, a first connector disposed at one end of each of the transmission lines, the first connector having a cladding body wherein the cladding body is positionable in the lashing eye of the first sealing component.

* * * * *